(12) United States Patent
Kim et al.

(10) Patent No.: US 11,055,550 B2
(45) Date of Patent: Jul. 6, 2021

(54) METHOD AND SYSTEM FOR CORRECTING ROAD SURFACE INFORMATION OF ELECTRONIC CONTROL SUSPENSION

(71) Applicants: Hyundai Motor Company, Seoul (KR); Kia Motors Corporation, Seoul (KR)

(72) Inventors: In Su Kim, Whasung-Si (KR); Seong Jun Choi, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 19 days.

(21) Appl. No.: 16/691,983

(22) Filed: Nov. 22, 2019

(65) Prior Publication Data

US 2021/0012131 A1    Jan. 14, 2021

(30) Foreign Application Priority Data

Jul. 8, 2019    (KR) .................... 10-2019-0082116

(51) Int. Cl.
| | | |
|---|---|---|
| *G06K 9/03* | (2006.01) | |
| *G06K 9/00* | (2006.01) | |
| *G06K 9/62* | (2006.01) | |
| *G06T 7/50* | (2017.01) | |

(52) U.S. Cl.
CPC ........... *G06K 9/03* (2013.01); *G06K 9/00805* (2013.01); *G06K 9/6288* (2013.01); *G06T 7/50* (2017.01); *G06T 2207/30192* (2013.01); *G06T 2207/30261* (2013.01)

(58) Field of Classification Search
CPC combination set(s) only.
See application file for complete search history.

(56) References Cited

U.S. PATENT DOCUMENTS

| | | | |
|---|---|---|---|
| 8,676,508 B2 | 3/2014 | Schwarz | |
| 8,762,000 B2 | 6/2014 | Schindler et al. | |
| 2005/0125155 A1* | 6/2005 | Kudo | B62D 6/002 |
| | | | 701/301 |
| 2012/0327239 A1* | 12/2012 | Inoue | G01S 15/931 |
| | | | 348/148 |

(Continued)

FOREIGN PATENT DOCUMENTS

| | | |
|---|---|---|
| JP | 2007-008404 A | 1/2007 |
| KR | 10-1997-0034276 A | 7/1997 |

(Continued)

*Primary Examiner* — Zhiyu Lu
(74) *Attorney, Agent, or Firm* — Morgan, Lewis & Bockius LLP

(57) ABSTRACT

A system for correcting road surface information related to an Electronic Control Suspension (ECS), may include a camera recognition information storage configured of securing camera recognition information related to a forward obstacle which is recognized through a navigation device and a camera; a sensor recognition information calculator configured of determining sensor recognition information related to the obstacle by receiving detecting values through vehicle behavior sensors; and a camera recognition information corrector configured of correcting the camera recognition information when a difference is generated between the camera recognition information and the sensor recognition information.

14 Claims, 3 Drawing Sheets

(56) References Cited

U.S. PATENT DOCUMENTS

| | | | | |
|---|---|---|---|---|
| 2014/0163837 A1* | 6/2014 | Um | ................... | B60W 30/143 |
| | | | | 701/93 |
| 2015/0046084 A1* | 2/2015 | Choi | ................. | G01C 21/3697 |
| | | | | 701/468 |
| 2015/0291177 A1* | 10/2015 | Lee | ...................... | B60W 40/06 |
| | | | | 73/146 |
| 2016/0046324 A1* | 2/2016 | Yu | ........................ | B60W 30/06 |
| | | | | 701/42 |
| 2016/0163198 A1* | 6/2016 | Dougherty | ............. | G08G 1/162 |
| | | | | 340/905 |
| 2016/0258764 A1* | 9/2016 | Phuyal | ................... | G01C 21/26 |
| 2016/0335923 A1* | 11/2016 | Hofmann | .............. | G09B 29/003 |
| 2017/0076607 A1* | 3/2017 | Linder | ................... | B60Q 1/346 |
| 2017/0197315 A1* | 7/2017 | Haegermarck | ........ | B25J 9/1692 |
| 2017/0199051 A1* | 7/2017 | Kim | .................... | G01C 21/3635 |
| 2017/0284812 A1* | 10/2017 | Kim | ................... | G01C 21/3658 |
| 2017/0301232 A1* | 10/2017 | Xu | ................... | G08G 1/096775 |
| 2018/0081368 A1 | 3/2018 | Watanabe et al. | | |
| 2019/0001965 A1* | 1/2019 | Cho | ...................... | B60W 10/06 |
| 2019/0114491 A1* | 4/2019 | Takaki | ............... | G06K 9/00805 |
| 2019/0311485 A1* | 10/2019 | Buczko | .................... | G06T 7/97 |
| 2020/0346654 A1* | 11/2020 | Kojo | ................ | G08G 1/096725 |

FOREIGN PATENT DOCUMENTS

| | | |
|---|---|---|
| KR | 10-1999-0059761 A | 7/1999 |
| KR | 10-2013-0068258 A | 6/2013 |
| KR | 10-2015-0034906 A | 4/2015 |
| KR | 10-1673776 B1 | 11/2016 |

* cited by examiner

METHOD AND SYSTEM FOR CORRECTING ROAD SURFACE INFORMATION OF ELECTRONIC CONTROL SUSPENSION

CROSS-REFERENCE TO RELATED APPLICATION

The present application claims priority to Korean Patent Application No. 10-2019-0082116, filed on Jul. 8, 2019 in the Korean Intellectual Property Office, the entire contents of which is incorporated herein for all purposes by this reference.

BACKGROUND OF THE INVENTION

Field of the Invention

The present invention relates to a method and a system for correcting road surface information related to an electronic control suspension, the method and system correcting erroneous obstacle information using obstacle information determined through a sensor of a vehicle when recognizing an error in obstacle information detected through a camera.

Description of Related Art

A preview Electronic Control Suspension (ECS) is an electronic suspension control system that can ensure passenger riding comfort and safety by receiving image information input from a camera mounted on a vehicle, recognizing the shape of a road surface in advance, and controlling a suspension actuator (damper) before passing over an obstacle on the surface road.

However, when the surface information input from a camera is abnormal or has an error, the location of an obstacle is not accurately found out, so a suspension system is not controlled at an accurate point in time before a vehicle passes over the obstacle, so there is a problem in that it is impossible to implement the peculiar advantages of a preview ECS.

As for an obstacle such as a pothole, it is required to recognize the obstacle in advance and perform appropriate control in accordance with the size of the obstacle, but when road surface information is recognized wrong and an ECS does not perform appropriate control, a severe problem such as damage to a tire may be caused.

Furthermore, when a camera recognizes a bump, a large error ratio may be generated in recognition of the bump, depending on an illumination change around the vehicle, external air temperature, rainfall, whether wipers are in operation, etc., so there is a problem of wrong recognition of road surface information.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method and a system for correcting road surface information related to an electronic control suspension, wherein when an error in obstacle information detected through a camera is found, the erroneous obstacle information is corrected using obstacle information determined through a sensor of a vehicle.

In view of an aspect, a method of correcting road surface information related to an Electronic Control Suspension (ECS) according to an exemplary embodiment of the present invention may include: securing camera recognition information related to a forward obstacle which is recognized through a camera by a controller; determining sensor recognition information related to the obstacle through vehicle behavior sensors by the controller; and correcting the camera recognition information when a difference is generated between the camera recognition information and the sensor recognition information by reflecting environment information detected from a surrounding environment of the vehicle by the controller.

An obstacle location on a road may be stored through a navigation device, and operation of the ECS may be controlled on the basis of the corrected camera recognition information when the vehicle passes over the obstacle after the camera recognition information is corrected.

The obstacle may include a bump and a pothole, and the camera recognition information and the sensor recognition information related to the obstacle may be at least one of a distance between the vehicle and the obstacle, a front-rear length and height of a bump, and a front-rear length and depth of a pothole.

The distance between the vehicle and the obstacle of the sensor recognition information may be determined by starting to accumulate movement distances of the vehicle by integrating a wheel speed, which is detected through a wheel speed sensor from a point in time when the camera recognizes a forward obstacle, with respect to a unit time, and by stopping integration of the movement distances at a point in time when a variation of wheel acceleration is equal to or more than a predetermined value.

The front-rear length of the bump of the sensor recognition information may be determined by starting to accumulate distances by integrating a wheel speed with respect to a unit time from a point in time when a variation of wheel acceleration determined through a wheel speed sensor is equal to or more than a predetermined value, and by stopping accumulation of the distances at a point in time when the variation of wheel acceleration becomes less than the predetermined value.

The front-rear length of the pothole of the sensor recognition information may be determined by starting to accumulate distances by integrating wheel speed with respect to a unit time from a point in time when a variation of vertical wheel acceleration determined through a wheel acceleration sensor is equal to or less than a predetermined value, and by stopping accumulation of the lengths at a point in time when the variation of vertical wheel acceleration reaches a value before the variation is equal to or less than the predetermined value.

The correcting of the camera recognition information may include: receiving input of environment information; determining an error ratio between the camera recognition information and the sensor recognition information when an absolute value of the difference between the camera recognition information and the sensor recognition information exceeds a predetermined value; determining a weight of an error ratio for the environment information; and correcting the camera recognition information by adding a product of a value of the difference between the camera recognition information and the sensor recognition information by the weight to the camera recognition information.

The environment information may be at least one of an illumination change around the vehicle, a rainfall, external air temperature, and whether wipers are in operation that are detected by an illumination sensor, a rain sensor, and an external air temperature sensor.

In view of another aspect, a system for correcting road surface information related to an Electronic Control Suspension (ECS) according to an exemplary embodiment of the present invention may include: a camera recognition information storage configured of securing camera recognition information related to a forward obstacle which is recognized through the navigation device and the camera by a controller; a sensor recognition information calculator configured of determining sensor recognition information related to the obstacle by receiving detecting values through vehicle behavior sensors; and a camera recognition information corrector configured of correcting the camera recognition information when a difference is generated between the camera recognition information and the sensor recognition information by reflecting environment information detected from a surrounding environment of the vehicle.

According to an exemplary embodiment of the present invention, whether obstacle information recognized through the navigation device and the camera has been recognized wrong is checked, and when there is misrecognition, the obstacle information is corrected by reflecting items of information according to the surrounding environmental conditions, increasing the accuracy of the location of the obstacle. Accordingly, it is possible to improve accuracy in suspension control by the preview ECS.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
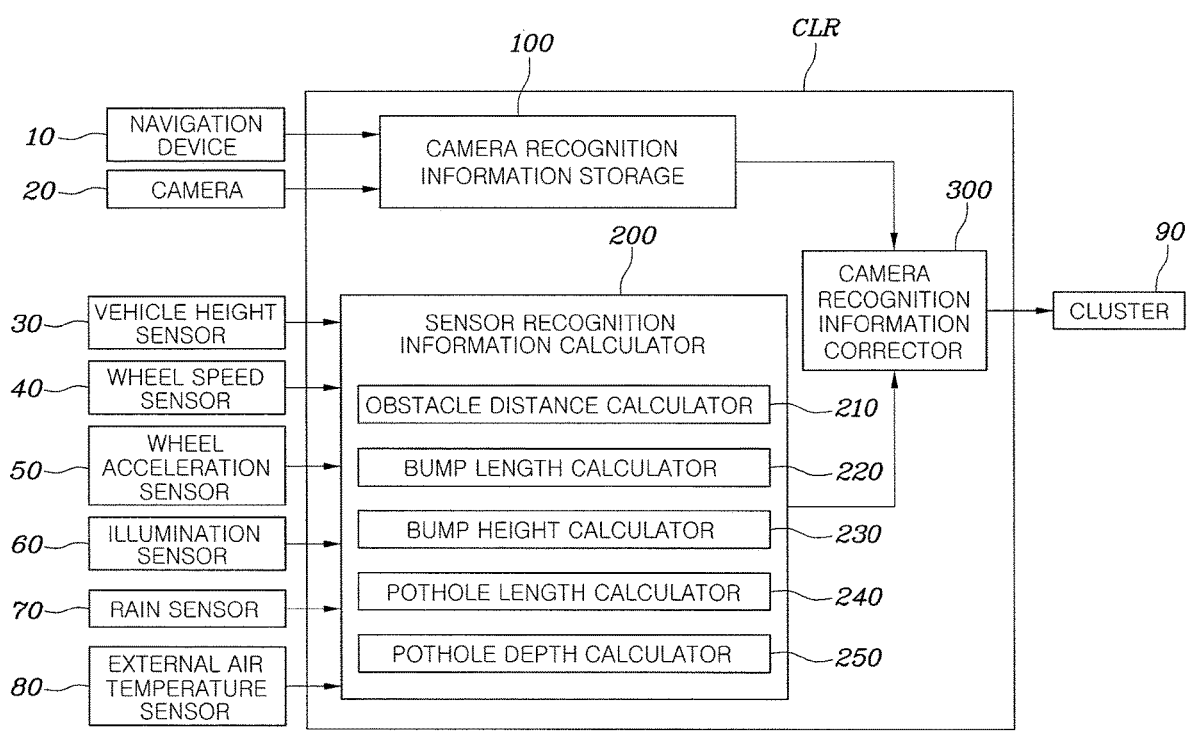
FIG. 1 is a diagram showing an exemplary configuration of a system for correcting road surface information related to an ECS according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present invention are described hereafter in detail with reference to the accompanying drawings.

Several various sensors including a navigation device 10 and a camera 20 are mounted in a vehicle which may be applied to the present invention. Data recognized by these sensors are transmitted to a controller (CLR) and the controller (CLR) detects errors in obstacle information on the basis of the data and corrects the obstacle information recognized by the camera 20 when detecting an error.

To the present end, the controller (CLR) of the present invention includes a camera recognition information storage 100, a sensor recognition information calculator 200, and a camera recognition information corrector 300.

The configuration of a system for correcting road surface information related to the present invention is described with reference to FIG. 1. Obstacle information on a set road based on forward obstacles detected through the navigation device 10 and camera recognition information related to forward obstacles photographed and recognized by the camera 20 are stored in the camera recognition information storage 100.

The obstacles may include a bump and a pothole and camera recognition information related to obstacles recognized through the navigation device 10 and the camera 20 may be at least one of the distance between the vehicle and an obstacle, the front-rear length and height of a bump, and the front-rear length and depth of a pot hole.

The sensor recognition information calculator 200 receives detecting values from vehicle behavior sensors mounted in a vehicle and determines sensor recognition information related to the obstacles.

As the vehicle behavior sensors, a wheel speed sensor 40, a wheel acceleration sensor 50, and a vehicle height sensor 30 may be applied, and sensor recognition information may be determined on the basis of detecting values transmitted from the sensors.

Accordingly, the sensor recognition information, which is information corresponding to the camera recognition information, is at least one of the distance between the vehicle and an obstacle, the front-rear length and height of a bump, and the front-rear length and depth of a pothole.

When a difference is generated between camera recognition information and sensor recognition information, the camera recognition information corrector 300 corrects the camera recognition information by reflecting environment information detected from the environment around the vehicle to the camera recognition information.

The environment information may be any one of an illumination change around the vehicle, a rainfall, external air temperature, whether wipers are in operation, and these items of information may be detected through signals that are transmitted from an illumination sensor 60, a rain sensor 70, and an external air temperature sensor 80 mounted in the vehicle.

The system may further include an operation controller that is configured to control operation of the ECS on the basis of the corrected camera recognition information when the vehicle passes over a corresponding obstacle after the camera recognition information is corrected.

Figure 2:
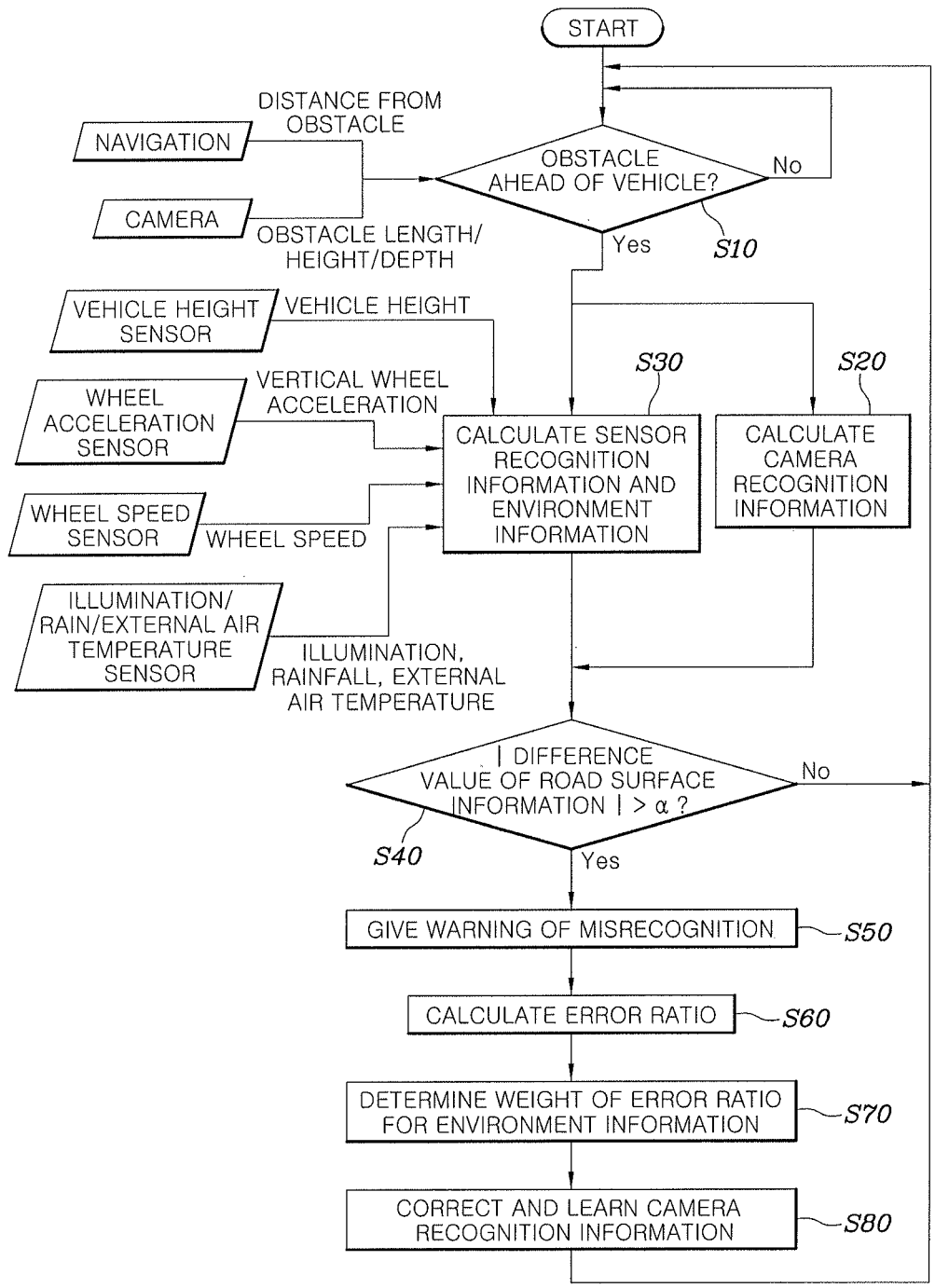
FIG. 2 is a diagram showing the flow of a method of correcting road surface information related to an ECS according to an exemplary embodiment of the present invention.

FIG. 2 is a diagram showing a correction method using the system for correcting road surface information. In a camera recognition information securing step, the controller (CLR) secures camera recognition information related to a forward obstacle which is recognized through a camera 20. Furthermore, the location of an obstacle on a road is stored through the navigation device 10, so that the distance between the obstacle and the vehicle may be detected.

Next, in the sensor recognition information determination step, the controller (CLR) determines sensor recognition information related to the obstacle through vehicle behavior sensors.

In a camera recognition information correction step, when a difference is generated between the camera recognition information and the sensor recognition information, the controller CLR corrects the camera recognition information by reflecting environment information detected from the environment around the vehicle to the camera recognition information.

Accordingly, it is possible to control operation of the ECS on the basis of the corrected camera recognition information when the vehicle passes over a corresponding obstacle after the camera recognition information is corrected.

That is, whether obstacle information recognized through the navigation device 10 and the camera 20 has been recognized wrong is checked, and when there is misrecognition, the obstacle information is corrected by reflecting items of information according to the surrounding environmental conditions, increasing the accuracy of the location of the obstacle. Accordingly, it is possible to improve accuracy in suspension control by the preview ECS.

Referring to FIG. 1 and FIG. 2, the distance between the vehicle and an obstacle of the sensor recognition information may be determined by an obstacle distance calculator 210 included in the sensor recognition information calculator 200.

The obstacle distance calculator 210 starts to accumulate the movement distances of the vehicle by integrating wheel speed, which is detected through the wheel speed sensor 40 from the point in time when the camera 20 recognizes a forward obstacle, with respect to a unit time. Furthermore, it determines the distance between the vehicle and the obstacle by stopping integration of the movement distances at the point in time when the variation of wheel acceleration is equal to or more than a predetermined value.

That is, when a wheel hits against an obstacle while the vehicle is driven, the wheel acceleration greatly changes, so it is possible to find out the point in time when the vehicle hits against the obstacle.

In more detail, according to an exemplary embodiment of the present invention, the locations of all bumps and potholes on the movement path of the vehicle are stored in the controller CLR using the navigation device 10.

Accordingly, when the location of a forward obstacle which is detected through the navigation device 10 exists within an effective distance (a predetermined set distance) from the vehicle while the vehicle is driven, the camera 20 recognizes the obstacle and transmits obstacle information to the controller CLR. Accordingly, the movement distances of the vehicle are accumulated by integrating the wheel speed with respect to a unit time at the present point in time, and when a large change of the wheel speed is generated, accumulation of the movement distances of the vehicle is stopped, determining the distance between the vehicle and the obstacle.

As an exemplary example, when the distance between the vehicle and an obstacle comes within a predetermined distance and the camera 20 recognizes obstacle information, the accumulation distance is determined from the present point in time until the front wheel hits against the obstacle and also the accumulation distance until the rear wheels hits against the obstacle is determined.

The movement distance between the vehicle and the obstacle may be determined by averaging the sump of the accumulation distances.

This may be expressed as the following Equation 1.

$$\text{movement distance between vehicle and obstacle} = \{(Wf \times \Delta T\_f) + (Wr \times \Delta T\_r)\}/2 \qquad \text{(Equation 1)}$$

Wf: wheel speed before front wheels hit against obstacle

Wr: wheel speed before rear wheels hit against obstacle $\Delta T\_f$: time from point in time when recognizing obstacle information to point in time when front wheels hit against obstacle $\Delta T\_r$: time from point in time when recognizing obstacle information to point in time when rear wheels hit against obstacle Furthermore, the front-rear length of a bump of the sensor recognition information may be determined by a bump length calculator 220 included in the sensor recognition information calculator 200.

The bump length calculator 220 starts to accumulate distances by integrating wheel speed with respect to a unit time from the point in time when a variation of wheel acceleration determined through the wheel speed sensor 40 is equal to or more than a predetermined value. Thereafter, it determines the front-rear length of a bump by stopping accumulation of the distances at the point in time when the variation of wheel acceleration becomes less than the predetermined value.

Figure 3:
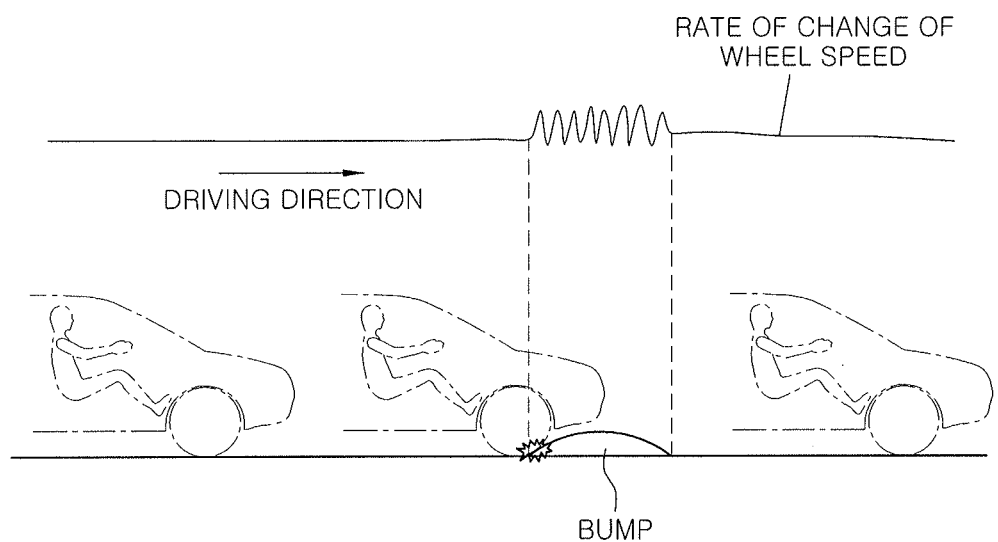
FIG. 3 is a diagram illustrating a wheel speed change when a vehicle passes over an obstacle in an exemplary embodiment of the present invention.

That is, as shown in FIG. 3, the variation of wheel acceleration when wheels passes over a bump is greater than that when the vehicle is driven on a common flat road, so it is possible to determine the front-rear length of a bump by accumulating and determining the distances per unit time in the period with a large variation of wheel acceleration.

As an exemplary example, it is possible to more accurately determine the front-rear length of a bump by averaging a period with a large change in wheel speed of front wheels and a period with a large change in wheel speed of rear wheels, which may be expressed as the following Equation 2.

$$\text{front-rear length of bump} = \{(Wf \times \Delta T\_fb) + (Wr \times \Delta T\_rb)\}/2 \qquad \text{(Equation 2)}$$

Wf: wheel speed before front wheels hit against obstacle (bump)

Wr: wheel speed before rear wheels hit against obstacle (bump)

$\Delta T\_fb$: time from point in time when variation of wheel acceleration of front wheels becomes predetermined value or more to point in time when variation of wheel acceleration of front wheels becomes less than predetermined value $\Delta T\_rb$: time from point in time when variation of wheel acceleration of rear wheels becomes predetermined value or more to point in time when variation of wheel acceleration of rear wheels becomes less than predetermined value Furthermore, the height of a bump of the sensor recognition information may be determined by a bump height calculator 230 included in the sensor recognition information calculator 200.

The bump height calculator 230 can determine the height of a bump using a detecting value which is detected through the vehicle height sensor 30 or the wheel acceleration sensor 50.

For example, when the vehicle height sensor 30 is used, it is possible to determine a variation of height of wheels by detecting and integrating a variation of speed of the wheels that are vertically moved through the vehicle height sensor 30, and accordingly, it is possible to determine the height of a bump.

Alternately, when the wheel acceleration sensor 50 is used, it is possible to find out the length that wheels vertically move by detecting and integrating twice the vertical acceleration of the wheels through the wheel acceleration sensor 50, and accordingly, it is possible to determine the height of a bump.

Furthermore, the front-rear length of a pothole of the sensor recognition information may be determined by a pothole length calculator 240 included in the sensor recognition information calculator 200.

The pothole length calculator 240 starts to accumulate distances by integrating wheel speed with respect to a unit time from the point in time when a variation of vertical wheel acceleration determined through the wheel acceleration sensor 50 is equal to or less than a predetermined value. Thereafter, accumulation of the lengths is stopped at the point in time when the variation of vertical wheel acceleration reaches the value before it is equal to or less than the predetermined value, determining the front-rear length of the pothole.

That is, when a wheel of a vehicle falls into a pothole, the vertical wheel acceleration value comes close to 0. Next, when the wheel passes over the pothole, the vertical acceleration value right before the wheel enters the pothole is generated. Accordingly, the front-rear length of the pothole is determined using the value until the vertical acceleration value becomes the acceleration value right before the wheel enters the pothole from the point in time when the vertical acceleration value comes close to 0.

As an exemplary example, it is possible to more accurately determine the front-rear length of a pothole by averaging a period with a large vertical acceleration change of front wheels and a period with a large vertical acceleration change of rear wheels, which may be expressed as the following Equation 3.

$$\text{front-rear length of pothole} = \{(Wf \times \Delta T\_fp) + (Wr \times \Delta T\_rp)\}/2 \quad \text{(Equation 3)}$$

Wf: wheel speed before front wheels hit against obstacle (bump)

Wr: wheel speed before rear wheels hit against obstacle (bump)

$\Delta T\_fp$: time from point in time when variation of vertical wheel acceleration of front wheels becomes predetermined value or less to point in time when variation of vertical wheel acceleration of front wheels reaches value right before it becomes predetermined value or less $\Delta T\_rp$: time from point in time when variation of vertical wheel acceleration of rear wheels becomes predetermined value or less to point in time when variation of vertical wheel acceleration of rear wheels reaches value right before it becomes predetermined value or less Furthermore, the depth of a pothole of the sensor recognition information may be determined by a pothole depth calculator 250 included in the sensor recognition information calculator 200.

The pothole depth calculator 250 can determine the depth of a pothole using a detecting value which is detected through the vehicle height sensor 30 or the wheel acceleration sensor 50.

For example, when the vehicle height sensor 30 is used, it is possible to determine a change in height of wheels by detecting and integrating a change in speed of the wheels that are vertically moved through the vehicle height sensor 30, and accordingly, it is possible to determine the depth of a pothole.

Alternately, when the wheel acceleration sensor 50 is used, it is possible to determine the length that wheels vertically move by detecting and integrating twice the vertical acceleration of the wheels through the wheel acceleration sensor 50, and accordingly, it is possible to determine the depth of a pothole.

On the other hand, the step of correcting camera recognition information is described in detail. An illumination change around the vehicle, a rainfall, external air temperature, and whether wipers are in operation are detected through the illumination sensor 60, the rain sensor 70, and the external air temperature sensor 80 mounted in the vehicle.

When it is determined that the absolute value of a difference between the camera recognition information and the sensor recognition information exceeds a predetermined value, the error ratio between the camera recognition information and the sensor recognition information is determined.

Furthermore, a weight of the error ratio for the environment information is determined.

Next, the camera recognition information is corrected by adding the product of a value of the difference between the camera recognition information and the sensor recognition information by the weight to the camera recognition information.

In detail, when obstacle information is determined from an image detected through the camera 20, a recognition error ratio of the obstacle is generated in accordance with an environment change.

That is, the environmental conditions such as an illumination change around the vehicle, a rainfall, external air temperature, and whether wipers are in operation are factors that influence the camera 20 determining the information related to an obstacle, and these signals are detected through various sensors mounted in the vehicle.

Accordingly, when environment information is input while a vehicle passes over an obstacle and the difference between camera recognition information related to the obstacle recognized through the navigation device 10 and the camera 20 and the sensor recognition information related to the obstacle estimated from the vehicle behavior sensors is a predetermined value or more, a warning of misrecognition of obstacle information is provided by turning on a warning light or displaying a warning sentence on a vehicle cluster 90 and then a weight is determined as follows.

$$\begin{pmatrix} Y_1 \\ \vdots \\ Y_n \end{pmatrix} = \begin{pmatrix} X_{11} & \cdots & X_{1m} \\ \vdots & \ddots & \vdots \\ X_{n1} & \cdots & X_{nm} \end{pmatrix} \begin{pmatrix} W_1 \\ \vdots \\ W_n \end{pmatrix} \dashrightarrow \begin{pmatrix} W_1 \\ \vdots \\ W_n \end{pmatrix} = \begin{pmatrix} X_{11} & \cdots & X_{1m} \\ \vdots & \ddots & \vdots \\ X_{n1} & \cdots & X_{nm} \end{pmatrix}^{-1} \begin{pmatrix} Y_1 \\ \vdots \\ Y_n \end{pmatrix}$$

$$Y = XW \rightarrow W = Y/X$$

$X_1 \sim X_n$: environment information (illumination, rain, external air temperature, etc.)

$Y_1 \sim Y_n$: error ratio
$W_1 \sim W_n$: weight

The weight may be individually determined from the distance between the vehicle and an obstacle, the front-rear length of a bump, the height of the bump, the front-rear length of pothole, and the depth of the pothole, so camera recognition information is corrected by multiplying the difference values of the obstacle information by the individually determined weights.

For example, equations for determining items of obstacle information, respectively, are as follows.

correction value for distance between vehicle and obstacle=camera recognition distance+(camera recognition distance−sensor recognition distance)×weight for distance between vehicle and obstacle.

correction value for front-rear length of bump=camera recognition bump length+(camera recognition bump length−sensor recognition bump length)×weight for bump length.

correction value for height of bump=camera recognition bump height+(camera recognition bump height−sensor recognition bump height)×weight for bump height.

correction value for front-rear length of pothole=camera recognition pothole length+(camera recognition pothole length−sensor recognition pothole length)×weight for pothole length.

correction value for depth of pothole=camera recognition pothole depth+(camera recognition pothole depth−sensor recognition pothole depth)×weight for pothole depth.

On the other hand, an exemplary process of correcting road surface information and correspondingly controlling the operation of an ECS is described with reference to FIG. 2. It is monitored whether there are obstacle such as a bump and a pothole on the road ahead of a vehicle through the navigation device 10 and the camera 20 (S10).

During the monitoring, when an obstacle is detected, camera recognition information which is corresponding obstacle information is acquired through the navigation device 10 and the camera 20. For example, the distance between the vehicle and the obstacle is secured, and when the obstacle is a bump, the front-rear length and height of the bump are secured, and when the obstacle is a pothole, the front-rear length and depth of the pothole are secured (S20).

Furthermore, sensor recognition information corresponding to the obstacle information is determined through various sensors mounted in the vehicle. That is, the distance between the vehicle and the obstacle, the front-rear length and height of the bump, and the front-rear length and depth of the pothole are determined (S30).

Furthermore, an illumination change around the vehicle, a rainfall, external air temperature, whether wipers are in operation are detected.

Next, the secured camera recognition information and the determined sensor recognition information are compared, and whether the difference between the items of information exceeds a predetermined value is determined (S40).

When the difference exceeds the predetermined value, as the result of determination, a warning of misrecognition of the camera recognition information is provided through the cluster 90 (S50) and the error ratio is determined for the corresponding obstacle information (S60).

Furthermore, a weight for the error ratio is determined on the basis of the environment information detected in advance (S70).

Next, the camera recognition information is corrected by adding the product of a value of the difference between the camera recognition information and the sensor recognition information by the weight to the camera recognition information, and the error ratio of the camera recognition information is learned through the corrected value (S80).

Thereafter, when the vehicle passes over such an obstacle again, ECS control is performed on the basis of the corrected and learned camera recognition information, performing suspension control of the vehicle.

As described above, whether the obstacle information recognized through the navigation device 10 and the camera 20 has been recognized wrong is checked, and when there is misrecognition, the obstacle information is corrected by reflecting items of information according to the surrounding environmental conditions, increasing the accuracy of the location of the obstacle. Accordingly, it is possible to improve accuracy in suspension control by the preview ECS.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of correcting road surface information related to an Electronic Control Suspension (ECS), the method comprising:

securing, by a controller, camera recognition information related to a forward obstacle which is recognized through a camera;

determining, by the controller, sensor recognition information related to an obstacle through vehicle behavior sensors; and correcting, by the controller, the camera recognition information upon determining that a difference is generated between the camera recognition information and the sensor recognition information, wherein the camera recognition information and the sensor recognition information related to the obstacle are a distance between the vehicle and the obstacle, and wherein the distance between the vehicle and the obstacle of the sensor recognition information is determined by starting to accumulate movement distances of the vehicle by integrating a wheel speed, which is detected through a wheel speed sensor from a point in time when the camera recognizes the forward obstacle, with respect to a unit time, and by stopping accumulation of the movement distances at a point in time when a variation of wheel acceleration is equal to or more than a first predetermined value.

2. The method of claim 1,
wherein an obstacle location on a road is stored through a navigation device, and
wherein operation of the ECS is controlled on a basis of the corrected camera recognition information upon determining that a vehicle passes over the obstacle after the camera recognition information is corrected.

3. The method of claim 2,
wherein the obstacle includes a bump and a pothole, and
wherein the camera recognition information and the sensor recognition information related to the obstacle further include a front-rear length and height of the bump, and a front-rear length and depth of the pothole.

4. The method of claim 3, wherein the front-rear length of the bump of the sensor recognition information is determined by starting to accumulate distances by integrating the wheel speed with respect to a unit time from a point in time upon determining that the variation of the wheel acceleration determined through the wheel speed sensor is equal to or more than a second predetermined value, and by stopping accumulation of the distances at a point in time upon determining that the variation of the wheel acceleration becomes less than the second predetermined value.

5. The method of claim 3, wherein the front-rear length of the pothole of the sensor recognition information is determined by starting to accumulate distances by integrating the wheel speed with respect to a unit time from a point in time when a variation of vertical wheel acceleration determined through a wheel acceleration sensor is equal to or less than a third predetermined value, and by stopping accumulation of the lengths at a point in time when the variation of vertical wheel acceleration reaches a value before the variation is equal to or less than the third predetermined value.

6. The method of claim 1, wherein the correcting of the camera recognition information includes:
receiving input of environment information detected from a surrounding environment of the vehicle;
determining an error ratio between the camera recognition information and the sensor recognition information upon determining that an absolute value of the difference between the camera recognition information and the sensor recognition information exceeds a fourth predetermined value;
determining a weight of an error ratio for the environment information; and
correcting the camera recognition information by adding a product of a value of the difference between the camera recognition information and the sensor recognition information by the weight to the camera recognition information.

7. The method of claim 6, wherein the environment information is at least one of an illumination change around the vehicle, a rainfall, external air temperature, and whether wipers are in operation that are detected by an illumination sensor, a rain sensor, and an external air temperature sensor.

8. A system of correcting road surface information related to an Electronic Control Suspension (ECS) of a vehicle, the system comprising a controller including:
a camera recognition information storage configured of securing camera recognition information related to a forward obstacle which is recognized through a navigation device and a camera;
a sensor recognition information calculator configured of determining sensor recognition information related to an obstacle by receiving detecting values through vehicle behavior sensors; and
a camera recognition information corrector configured of correcting the camera recognition information when a difference is generated between the camera recognition information and the sensor recognition information,
wherein the camera recognition information and the sensor recognition information related to the obstacle are a distance between the vehicle and the obstacle, and
wherein the distance between the vehicle and the obstacle of the sensor recognition information is determined by starting to accumulate movement distances of the vehicle by integrating wheel speed, which is detected through a wheel speed sensor from a point in time when the camera recognizes the forward obstacle, with respect to a unit time, and by stopping accumulation of the movement distances at a point in time when a variation of wheel acceleration is equal to or more than a first predetermined value.

9. The system of claim 8,
wherein an obstacle location on a road is stored through the navigation device, and
wherein operation of the ECS is controlled on a basis of the corrected camera recognition information upon determining, by the controller, that the vehicle passes over the obstacle after the camera recognition information is corrected.

10. The system of claim 9,
wherein the obstacle includes a bump and a pothole, and
wherein the camera recognition information and the sensor recognition information related to the obstacle further include a front-rear length and height of the bump, and a front-rear length and depth of the pothole.

11. The system of claim 10, wherein the front-rear length of the bump of the sensor recognition information is determined by starting to accumulate distances by integrating the wheel speed with respect to a unit time from a point in time when a variation of wheel acceleration determined through the wheel speed sensor is equal to or more than a second predetermined value, and by stopping accumulation of the distances at a point in time when the variation of wheel acceleration becomes less than the second predetermined value.

12. The system of claim 10, wherein the front-rear length of the pothole of the sensor recognition information is determined by starting to accumulate distances by integrating the wheel speed with respect to a unit time from a point in time when a variation of vertical wheel acceleration determined through a wheel acceleration sensor is equal to or less than a third predetermined value, and by stopping accumulation of the lengths at a point in time when the variation of vertical wheel acceleration reaches a value before the variation is equal to or less than the third predetermined value.

13. The system of claim 8, wherein in correcting of the camera recognition information, the camera recognition information corrector is configured of:
receiving input of environment information detected from a surrounding environment of the vehicle;
determining an error ratio between the camera recognition information and the sensor recognition information upon determining that an absolute value of the difference between the camera recognition information and the sensor recognition information exceeds a fourth predetermined value;

determining a weight of an error ratio for the environment information; and correcting the camera recognition information by adding a product of a value of the difference between the camera recognition information and the sensor recognition information by the weight to the camera recognition information.

14. The system of claim 13, wherein the environment information is at least one of an illumination change around the vehicle, a rainfall, external air temperature, and whether wipers are in operation that are detected by an illumination sensor, a rain sensor, and an external air temperature sensor.

* * * * *